United States Patent [19]
McPherson

[11] Patent Number: 5,855,166
[45] Date of Patent: Jan. 5, 1999

[54] RETROFIT MEASURING DEVICE FOR A HAY BALER

[76] Inventor: Bobby Roy McPherson, 2065 Road 311, New Castle, Colo. 81647

[21] Appl. No.: 808,335

[22] Filed: Feb. 28, 1997

Related U.S. Application Data

[63] Continuation-in-part of Ser. No. 728,038, Oct. 9, 1996, Pat. No. 5,783,816.

[51] Int. Cl.$^6$ ..................................................... A01F 15/08
[52] U.S. Cl. ................................. 100/3; 100/4; 100/19 R; 100/99
[58] Field of Search ....................... 100/2–4, 11, 17–24, 100/43, 99, 179, 188 R

[56] References Cited

U.S. PATENT DOCUMENTS

| | | |
|---|---|---|
| 1,868,218 | 7/1932 | Nilsson . |
| 2,477,059 | 7/1949 | Hill . |
| 2,720,159 | 10/1955 | Seltzer ......................................... 100/4 |
| 2,989,172 | 6/1961 | Stoll . |
| 3,024,719 | 3/1962 | Englund ..................................... 100/99 |
| 3,028,117 | 4/1962 | Shepley . |
| 3,212,433 | 10/1965 | Raab .......................................... 100/99 |
| 4,089,482 | 5/1978 | Mooney et al. . |
| 4,095,520 | 6/1978 | Burford ...................................... 100/43 |
| 4,151,403 | 4/1979 | Woolston . |
| 4,337,903 | 7/1982 | Kessler et al. . |
| 4,563,854 | 1/1986 | Ackerman et al. . |
| 4,711,078 | 12/1987 | Schaible et al. ............................. 100/4 |
| 4,718,336 | 1/1988 | Munro . |
| 5,426,923 | 6/1995 | Underhill . |
| 5,783,816 | 7/1998 | McPherson ................................. 100/4 |

FOREIGN PATENT DOCUMENTS

| | | | |
|---|---|---|---|
| 387666 | 10/1973 | U.S.S.R. ..................................... | 100/4 |
| 2019040 | 10/1979 | United Kingdom ....................... | 100/4 |

*Primary Examiner*—Stephen F. Gerrity
*Attorney, Agent, or Firm*—Jennifer L. Bales; Macheledt Bales & Johnson LLP

[57] ABSTRACT

Retrofittable hay bale measuring apparatus measures the size of the hay bale being formed, and indicates the size of the bale being formed to a control and display unit. The baler operator sets the desired hay bale size and monitors the baler operation on the display. A contact wheel, which contacts the hay bale and rotates as the bale is being formed, is rotationally attached to a measuring wheel. Alternatively, the contact wheel may itself comprise the measuring wheel. The rotation of the measuring wheel is monitored by a rotation detector which generates a hay bale measuring signal, and sends it to the control and display unit. The control and display unit generates a signal which indicates to the baler when it is time to tie off a bale of hay, based upon the measuring signal.

17 Claims, 5 Drawing Sheets

RETROFIT MEASURING DEVICE FOR A HAY BALER

This application is a continuation in part of patent application Ser. No. 08/728,038 filed on Oct. 9, 1996 for Measuring Device for a Hay Baler, now U.S. Pat. No. 5,783,816.

BACKGROUND OF THE INVENTION

1. Field of the Invention

The present invention relates to hay balers. More particularly, the present invention relates to a retrofittable measuring device to determine bale size for use in hay balers.

2. Description of the Prior Art

Hay balers are complicated mechanical devices designed to pick up previously cut hay in the field, form it into uniform bales, tie the bales, and drop the bales on the ground as the operator drives the hay baler at a reasonably uniform rate of speed. Modern hay balers are extremely complicated, requiring constant maintenance and adjustment to operate properly. One area which becomes uncalibrated particularly quickly are the mechanisms for measuring and forming uniform bales of hay.

A detailed description of the structure and operation of hay balers may be found in many sources. For example, refer to John Deere Operator Manual OME81606 (BALER 468), or AGCO Hesston Form Number 700 710 200 (4655 Square Baler). However, a brief discussion of the measuring and tying mechanisms on conventional hay balers will assist in understanding the current invention. FIG. 1 shows a string box 10 containing several balls 12 of string 15. The particular string box 10 shown in FIG. 1 contains six balls of string. The end of one ball of string is tied to the beginning of the next roll until three rolls are tied together, and the beginning of the first roll is threaded through several eyelet's 13 and a hole 14 before being provided to one of the two tying mechanisms. The other three rolls are similarly tied together, strung through separate eyelet's 13 and the other hole 14, and provided to the other tying mechanism.

FIGS. 2 and 3 show the measuring mechanism used in conventional hay balers. All conventional hay balers use approximately the same measuring mechanism, with some small changes. Measuring assembly 35 comprises trip arm 34, arms 36 and 38, arc 37, and stop collar 42. Star wheel 44 is connected to metering gear 45 via rod 46. Trip arm 34 moves into and out of contact with cam 22.

The measuring mechanism starts out in the configuration shown in FIG. 2, as the hay bale is being formed. Star wheel 44 contacts the top surface of the hay bale being formed. As the hay moves past, star wheel 44 turns counterclockwise, turning rod or shaft 46 connected to metering gear 45. Metering gear 45 causes arc 37 to move upward until the shaft moves into trip notch 40. This allows the measuring assembly 35 to move left and rotate clockwise slightly, except trip arm 34, which rotates counterclockwise, so that end 32 moves out of contact with dog 31, and reset roller 33 moves out of the way of protrusion 29. Spring loaded gear 20 begins to rotate counterclockwise. This is the configuration shown in FIG. 3

Gear 20 rotates counterclockwise one revolution. As it rotates, lower portion 23 of reset cam 22 forces reset roller 33 to the right, rotating trip arm 34 clockwise. This causes the measuring assembly to rotate clockwise back to its original position shown in FIG. 2. Metering gear 45 stops when it hits stop collar 42. Protrusion 29 on rim 28 moves roller 33 slightly upward, moving end 32 of arm 34 back into position to contact dog 31 and prevent gear 20 from rotating further.

Chain 26 engages with gear teeth 24, and is used to drive the knotting mechanism shown in FIGS. 4A–4F. In some hay balers, chain 26 is replaced by a gear for driving the knotting mechanism. The size of the hay bales is controlled by loosening stop adjustment 43, moving stop collar 42, and retightening stop adjustment 43. This method of determining hay bale size is inherently imprecise, and stop collar 42 is subject to jarring and vibrations which cause it to move while the baler is operating. Thus, hay bales from a short period of baling can vary in size so much they are difficult to stack.

FIGS. 4A through 4F show the bale tying process mechanically triggered by the rotation of gear 20. In FIG. 4A, the bale is being formed, and string 15 is held in string disk 49 by string holder 48. It is fed from string box 10. String 15 feeds down from string holder 49, over billhook 52, through guide 51, over the top of bale. Needle 60 holds the other end of string 15, pulling it around under the bale. In FIG. 4B, needle 60 brings the end of string 15 up through guide 51 and into string disk 49. In FIG. 4C, billhook 52 starts to rotate to the left, forming a loop of string around the hook. In FIG. 4D, billhook jaw 54 opens to receive the string as billhook 52 continues to rotate. In FIG. 4E, billhook jaw 54 closes to pull the knot tight, and knife 56 on knife arm 57 cuts the string. Needle 60 withdraws, pulling string 15 in place for the next bale. In FIG. 4F the severed ends of the string slide out of billhook 52.

A need remains in the art for improved retrofittable apparatus for measuring hay bales in hay balers.

SUMMARY OF THE INVENTION

An object of the present invention is to provide improved retrofittable apparatus for measuring hay bales in hay balers.

A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, has an improved measuring and actuating device comprising a measuring device for measuring the size of the hay bale as it is being formed and generating a measuring signal based upon the size of the bale, and an actuating device connected to the measuring device for actuating the tying mechanism when the measuring signal reaches a predetermined value.

Generally, the bale measuring device comprises the star wheel or contact wheel, which contacts the hay bale and rotates as the hay bale is formed, a measuring wheel, coaxial to and spaced apart from the star wheel, a rod rigidly attaching the axes of the contact wheel and the measuring wheel so the contact wheel and the measuring wheel turn together, and a rotation detecting device for detecting the rotation of the measuring wheel and generating the bale measuring signal based upon the rotation of the measuring wheel. The rotation detecting device may also measure the rotation of the contact wheel directly, eliminating the need for the measuring wheel and rod. The rotation detecting device may detect a plurality of spaced apart protrusions affixed about the perimeter of the measuring or contact wheel, and include a beam generator for generating a beam of light parallel to the axis of the wheel and directed at the protrusions, such that the beam of light is periodically interrupted by the protrusions as the wheel turns, and a beam detector aligned with the beam generator and located on the opposite side of the protrusions from the light beam generator for detecting the beam of light and generating the string measuring signal based upon detecting the beam of light. Or, the measuring wheel or contact wheel may include a plurality of magnets placed about the periphery of the wheel. The rotation detection device would then detect the movement of the magnets.

The measuring wheel and the rotation detecting device may be located within a sealed unit.

The measuring and actuating device further includes means for allowing an operator to input and modify the predetermined value, means for allowing the operator to manually override the measuring and actuating device and tie off a bale immediately, means for providing the measuring signal to the operator, and bale monitoring means for monitoring when the actuating device actuates the tying mechanism, and maintaining a count of the number of times the actuating means actuates the tying mechanism, thereby counting the number of hay bales formed by the hay baler, and providing the count to the operator.

DETAILED DESCRIPTION OF THE PREFERRED EMBODIMENT

Figure 1:
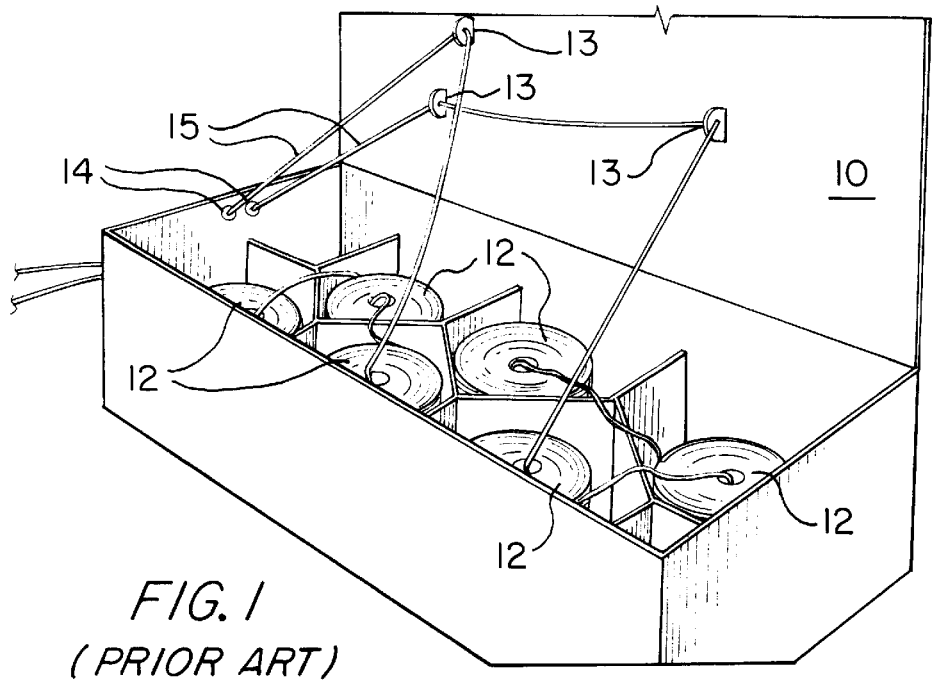
FIG. 1 (prior art) shows a string box for dispensing string to a hay baler.
Figure 2:
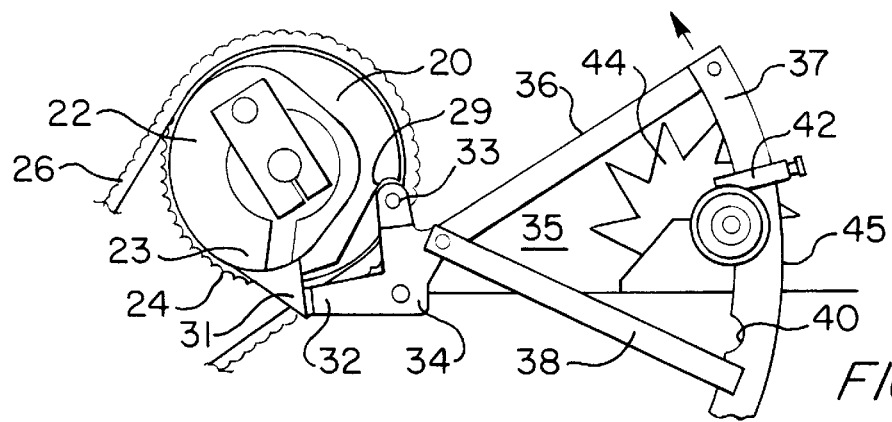
FIG. 2 (prior art) shows the measuring mechanism used in conventional hay balers, while the hay bale is being formed.
Figure 3:
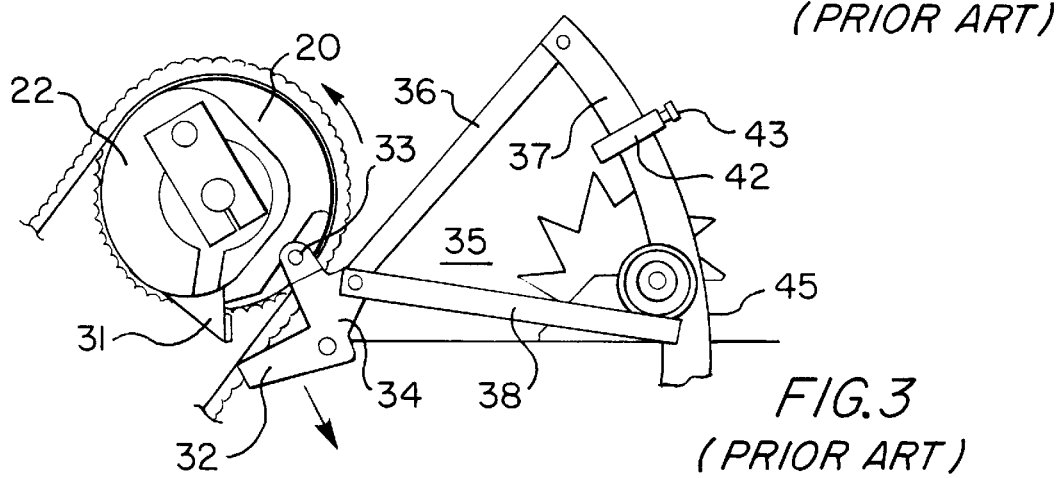
FIG. 3 (prior art) shows the measuring mechanism of FIG. 2, as the hay bale is tied off.
Figure 4A:
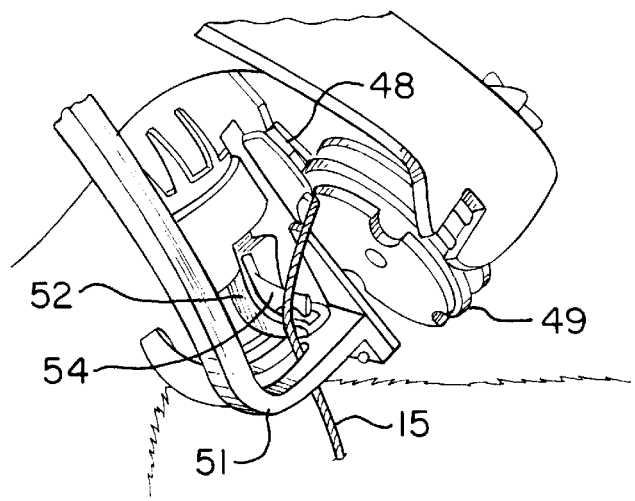
FIGS. 4A, 4B, 4C, 4D, 4E, and 4F (prior art) show the bale tying mechanism in conventional hay balers.
Figure 4B:
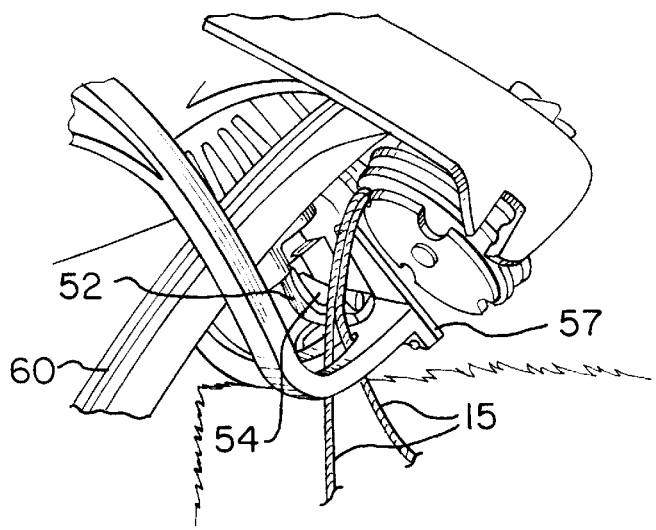
Figure 4C:
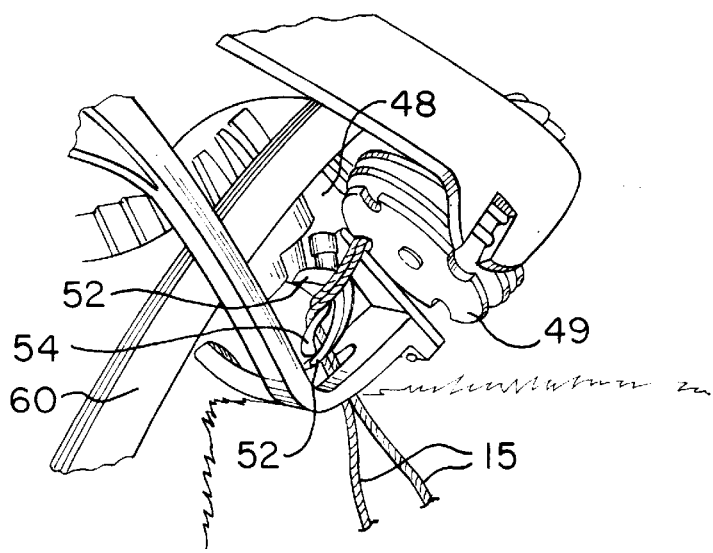
Figure 4D:
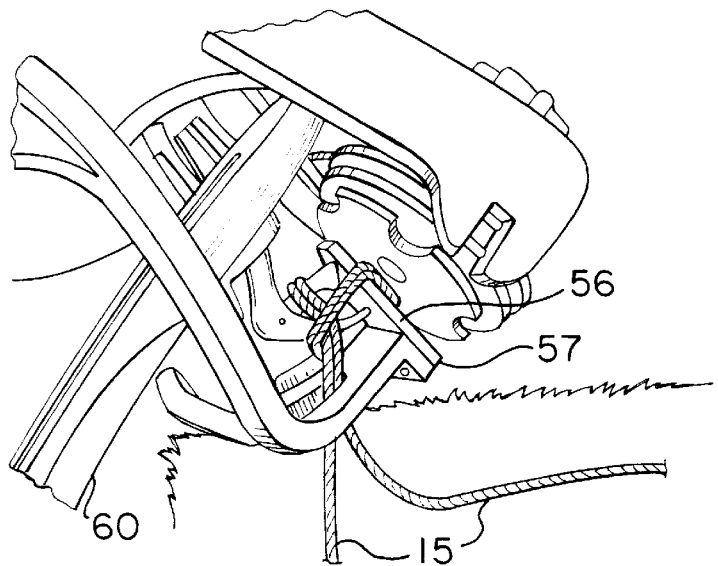
Figure 4E:
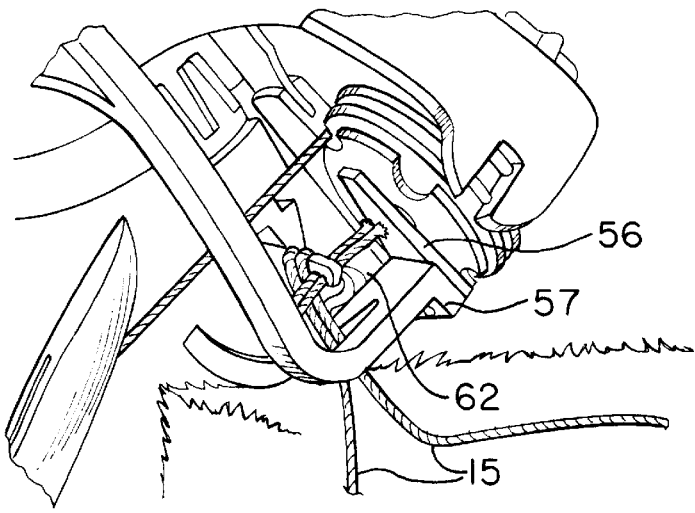
Figure 4F:
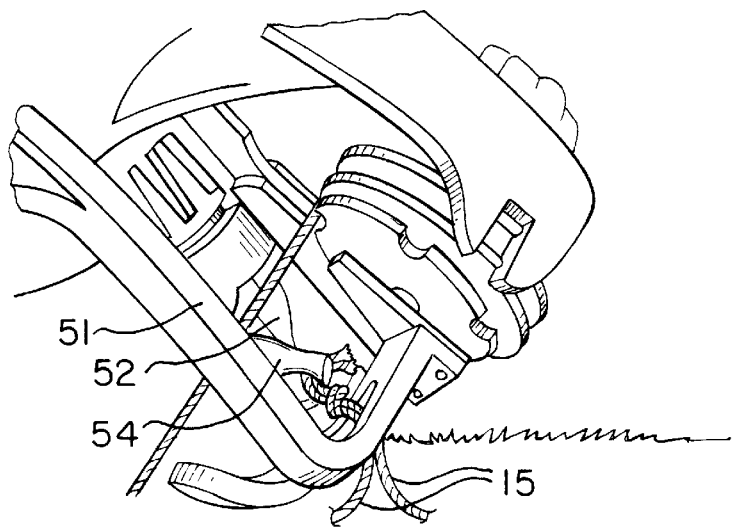
Figure 5:
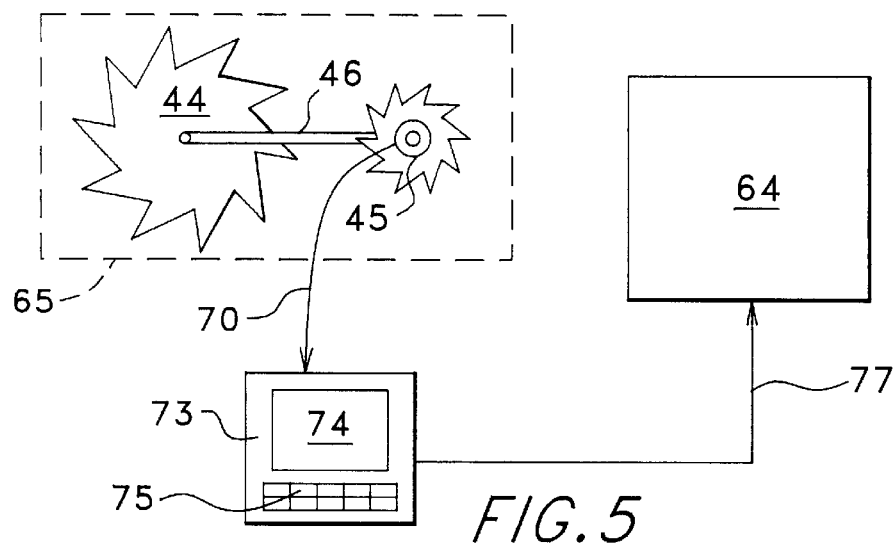
FIG. 5 shows a hay bale measuring apparatus according to the present invention.
Figure 7:
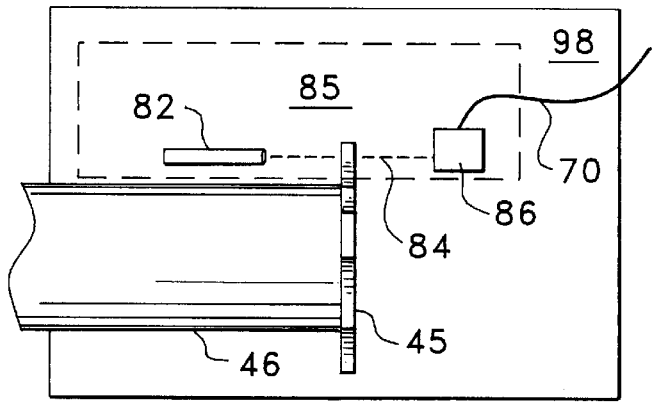
FIG. 7 shows an optical beam generator and detector for use with the measuring apparatus of FIG. 5.

FIG. 5 shows the preferred embodiment of hay bale measuring assembly 65. Measuring assembly 65 utilizes star wheel 44, rod 46, and measuring wheel 45 (shown in more detail in FIGS. 2 and 3), along with rotation detection apparatus 85, for measuring the size of the hay bale currently being formed. The rotation of measuring wheel 45 is measured by rotation detection apparatus 85 (shown in FIGS. 7 and 10) to provide a signal 70 related to the size of the hay bale being formed.

Those skilled in the art will appreciate that the use of star wheel 44 as the contact wheel, rod 46, and metering gear 45 as the measuring wheel is convenient for retrofit purposes. However, these elements may be replaced with some other contact wheel in contact with the hay bale for turning as the bale is formed, coaxially attached to a measuring wheel. The star wheel or contact wheel may even be used as the measuring wheel, but this may be impractical because of the dirty environment in the hay baler. In this case, the measuring wheel is spaced apart from the star wheel, and may be sealed in a housing unit 98 along with rotation detection apparatus 85 to keep it clean.

Signal 70 indicates the size of the hay bale measured by measuring assembly 65 to control and display unit 73. The baler operator sets the desired hay bale size via controls 75 and monitors the baler operation on display 74. Control and display unit 73 also generates signal 77, which indicates to bale former and tying mechanism 64 when it is time to tie off a bale of hay. In the preferred embodiment, the operator may override the control and display unit and manually generate signal 77 to tie off the bale immediately. This manual override could be used in case of equipment malfunction.

Figure 6:
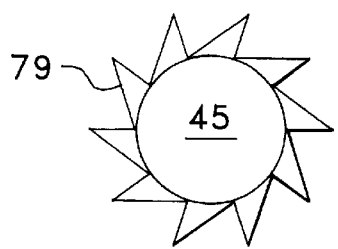
FIG. 6 shows the measuring wheel used to measure the hay bale in the measuring apparatus of FIG. 5.

FIG. 6 shows measuring wheel 45 for use in measuring apparatus 65. Any one of a variety of known methods may be used to measure the hay bale. In one preferred embodiment, measuring wheel 45 has a series of teeth 79 formed around its perimeter, and is used with an optical beam generator 82 and optical beam detector 86 of FIG. 7. The hay bale turns wheel 44 as it is being formed. As star wheel 44 turns, measuring wheel 45 turns, and teeth 79 interrupt the beam from beam generator 82. Thus, beam detector 86 receives a series of bursts of light, the frequency of which is related to how quickly measuring wheel 45 is turning. Thus, if star wheel 44 has a circumference of one foot, and measuring wheel 45 has ten teeth 79, each burst of light indicates that one tenth of a foot of the hay bale has been formed. In the preferred embodiment, beam detector 86 simply generates a burst of current on line 70 coincident with each burst of light.

Figure 10:
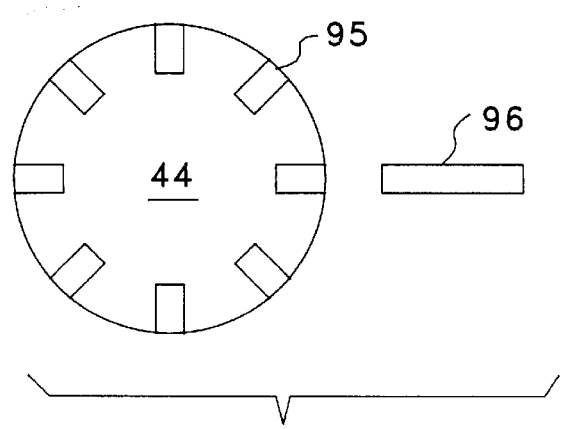
FIG. 10 shows a second embodiment of the measuring apparatus.

In an alternative embodiment shown in FIG. 10, measuring wheel 45 (or contact wheel 44) has a series of magnets (or magnetic tape or the like) 95 attached about its perimeter. Rotation detection apparatus 85 then comprises means 96 for detecting the movement of the magnets. In this case, measuring wheel 45 may simply comprise the end of rod 46.

Figure 8:
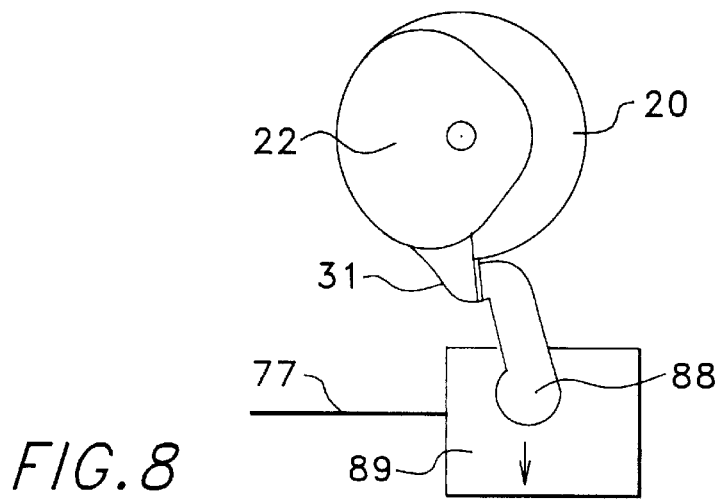
FIG. 8 shows a mechanical arm for triggering the hay bale tying operation, for use with the measuring apparatus of FIG. 5.

FIG. 8 shows how the tying mechanism as shown in FIGS. 4A–E is triggered in the present invention. Conventional measuring assembly 35 (comprising trip arm 34, arms 36 and 38, arc 37, and stop collar 42) is partially or entirely removed. Trip arm 34 is replaced by a mechanical arm 88, capable of moving down or pivoting out of the way of dog 31. The device 89 for moving arm 88 is triggered by signal 77 from control and display module 73. In the preferred embodiment, device 89 comprises a solenoid for using electricity to move arm 88. Arm 88 is biased toward dog 31, so that arm 88 moves back into position in time to prevent gear 20 from rotating more than once. As gear 20 rotates, it triggers the tying mechanism as described above and shown in FIGS. 4A–E. If desired, trip arm 34 could be left in place and used as mechanical arm 88.

Figure 9:
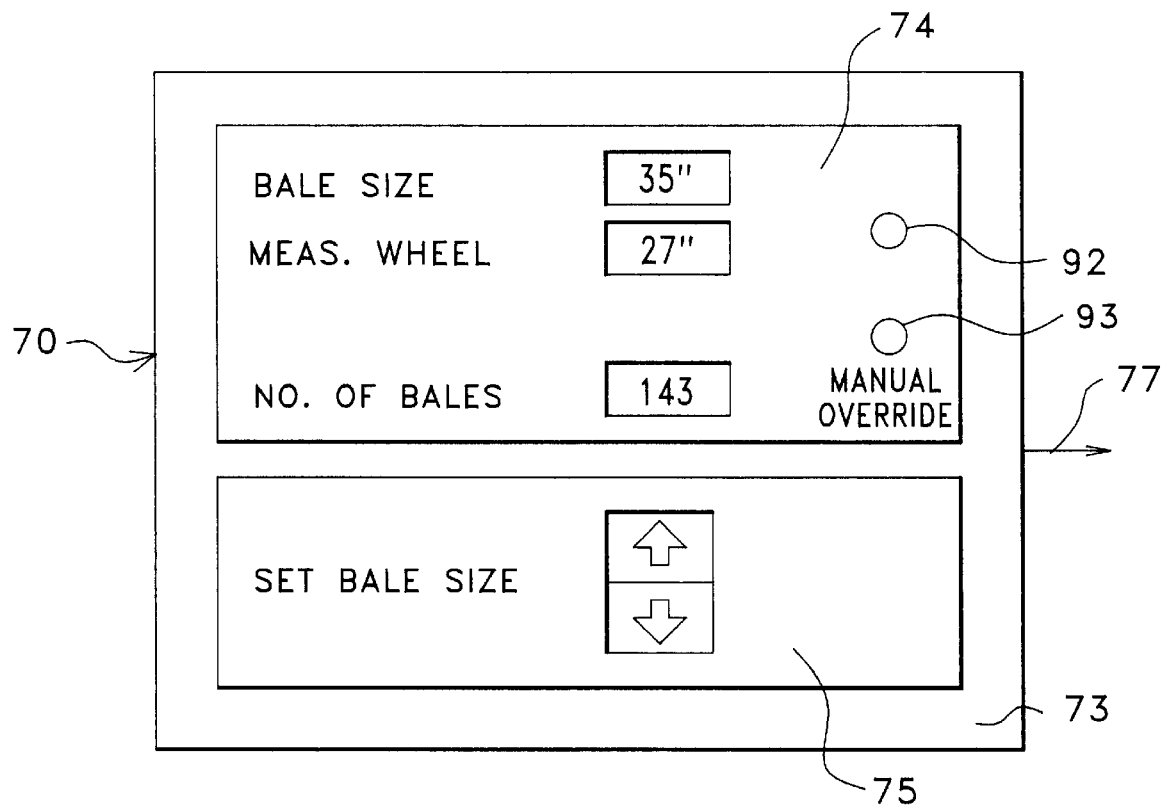
FIG. 9 shows an example of a display for use with the measuring apparatus of FIG. 5.

FIG. 9 shows an example of a control and display module 73 for use with measuring apparatus 65 of FIG. 5. The baler operator sets the desired hay bale size using controls 75. Control and display module 73 counts the bursts of voltage on line 70, and computes the size of the hay bale measured by measuring assembly 65 since the last bale was tied off. When the current hay bale reaches its desired size, signal 77 is generated to trigger the tying mechanism. Manual override button 93 is used to manually send signal 77 to tying mechanism 64, causing tying mechanism 64 to tie off the bale right away.

Displays 74 in the preferred embodiment include the desired bale size, the size of the hay bale measured by measuring assembly 65 for the current bale being formed, and a count of the number of bales already formed.

While the exemplary preferred embodiments of the present invention are described herein with particularity, those skilled in the art will appreciate various changes, additions, and applications other than those specifically mentioned, which are within the spirit of this invention.

What is claimed is:

1. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

a hay bale measuring assembly for measuring the size of a hay bale as it is being formed, said measuring assembly generating a measuring signal based upon the size of the hay bale, said measuring assembly including:

a contact wheel contacting the hay bale whereby the contact wheel rotates as the hay bale is formed, a measuring wheel coaxial to the contact wheel and rotationally attached to the contact wheel, and rotation detecting means for detecting the rotation of the measuring wheel and further for generating said measuring signal based upon the rotation of the measuring wheel, said rotation detecting means including:

a plurality of spaced apart protrusions affixed about the perimeter of said measuring wheel;

beam generating means for generating a beam of light parallel to the axis of the measuring wheel and directed at the protrusions, such that the beam of light is periodically interrupted by the protrusions as the measuring wheel turns; and beam detection means aligned with the beam generating means and located on the opposite side of the protrusions from the light beam generating means for detecting the beam of light when said beam is not interrupted, said beam detection means further generating said measuring signal based upon detecting the beam of light; and actuating means connected to the measuring means for actuating the tying mechanism when the measuring signal reaches a predetermined value.

2. The measuring and actuating device of claim 1, further including a housing disposed about the measuring wheel and the rotation detecting means.

3. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

a hay bale measuring assembly for measuring the size of a hay bale as it is being formed, said measuring assembly generating a measuring signal based upon the size of the hay bale, said measuring assembly including:

a contact wheel contacting the hay bale whereby the contact wheel rotates as the hay bale is formed;

a measuring wheel coaxial to the contact wheel and rotationally attached to the contact wheel; and rotation detecting means for detecting the rotation of the measuring wheel and further for generating said measuring signal based upon the rotation of the measuring wheel, said rotation detecting means including:

a plurality of spaced apart magnetic areas about the perimeter of said measuring wheel; and magnet detection means for detecting the movement of the magnetic areas, said magnet detection means further generating said measuring signal based upon detecting the movement of the magnetic areas; and actuating means connected to the measuring means for actuating the tying mechanism when the measuring signal reaches a predetermined value.

4. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

a hay bale measuring assembly for measuring the size of a hay bale as it is being formed, said measuring assembly generating a measuring signal based upon the size of the hay bale, said measuring assembly including:

a contact wheel contacting the hay bale whereby the contact wheel rotates as the hay bale is formed, and rotation detecting means for detecting the rotation of the contact wheel and further for generating said measuring signal based upon the rotation of the contact wheel; said rotation detection means including:

a plurality of spaced apart protrusions affixed about the perimeter of said contact wheel;

beam generating means for generating a beam of light parallel to the axis of the contact wheel and directed at the protrusions, such that the beam of light is periodically interrupted by the protrusions as the contact wheel turns; and beam detection means aligned with the beam generating means and located on the opposite side of the protrusions from the light beam generating means for detecting the beam of light when said beam is not interrupted, said beam detection means further generating said measuring signal based upon detecting the beam of light; and actuating means connected to the measuring means for actuating the tying mechanism when the measuring signal reaches a predetermined value.

5. The measuring and actuating device of claim 4, further including means for allowing an operator to input and modify said predetermined value.

6. The measuring and actuating device of claim 5, further including means for providing said measuring signal to the operator.

7. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

a hay bale measuring assembly for measuring the size of a hay bale as it is being formed, said measuring assembly generating a measuring signal based upon the size of the hay bale, said measuring assembly including:

a contact wheel contacting the hay bale whereby the contact wheel rotates as the hay bale is formed, and rotation detecting means for detecting the rotation of the contact wheel and further for generating said measuring signal based upon the rotation of the contact wheel; said rotation detection means including:

a plurality of spaced apart magnetic areas about the perimeter of said contact wheel; and magnet detection means for detecting the movement of the magnetic areas, said magnet detection means further generating said measuring signal based upon detecting the movement of the magnetic areas; and actuating means connected to the measuring means for actuating the tying mechanism when the measuring signal reaches a predetermined value.

8. The measuring and actuating device of claim 7, further including means for allowing an operator to input and modify said predetermined value.

9. The measuring and actuating device of claim 8, further including means for providing said measuring signal to the operator.

10. The measuring and actuating device of claim 9, further comprising:

bale monitoring means for monitoring when the actuating means actuates the tying mechanism, said bale monitoring means further maintaining a count of the number of times the actuating means actuates the tying mechanism, thereby counting the number of hay bales formed by the hay baler, said bale monitoring means further providing said count to the operator.

11. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

a hay bale measuring assembly for measuring the size of a hay bale as it is being formed, said measuring assembly generating a measuring signal based upon the size of the hay bale;

actuating means connected to the measuring means for actuating the tying mechanism when the measuring signal reaches a predetermined value;

means for allowing an operator to input and modify said predetermined value; and bale monitoring means for monitoring when the actuating means actuates the tying mechanism, said bale monitoring means further maintaining a count of the number of times the actuating means actuates the tying mechanism, thereby counting the number of hay bales formed by the hay baler, said bale monitoring means further providing said count to the operator.

12. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

a hay bale measuring assembly for measuring the size of a hay bale as it is being formed, said measuring assembly generating a measuring signal based upon the size of the hay bale;

actuating means connected to the measuring means for actuating the tying mechanism when the measuring signal reaches a predetermined value; and means for allowing an operator to actuate the tying mechanism before the measuring signal reaches the predetermined value.

13. In a hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, the method of determining when the hay bale being formed has reached a predetermined size and actuating the tying mechanism comprising the steps of:

measuring the size of a hay bale as the hay bale is being formed;

generating a bale measuring signal based upon the size of the hay bale; actuating the tying mechanism when the measuring signal reaches a predetermined value;

monitoring when the actuating means actuates the tying mechanism;

maintaining a count of the number of times the actuating means actuates the tying mechanism; and providing said count to an operator.

14. The method of claim 13 wherein the measuring step comprises the steps of:

placing a contact wheel in contact with the hay bale being formed whereby the wheel rotates as the hay bale is formed; and detecting the rotation of the contact wheel and generating said bale measuring signal based upon the rotation of the contact wheel.

15. The method of claim 13 wherein the measuring step comprises the steps of:

placing a contact wheel in contact with the hay bale being formed whereby the wheel rotates as the hay bale is formed;

rotationally attaching a measuring wheel to the contact wheel; and detecting the rotation of the measuring wheel and generating said bale measuring signal based upon the rotation of the measuring wheel.

16. The method of claim 13, further comprising the step of:

responsive to a command by an operator, modifying the predetermined value.

17. The method of claim 13, further comprising the step of:

responsive to a command by an operator, actuating the tying mechanism before the measuring signal reaches the predetermined value.

\* \* \* \* \*